A. HEBBARD.
Car Spring.

No. 113,768. Patented April 18, 1871.

Witnesses:

Inventor:
Albert Hebbard.
by his atty,
Horace Binney, 3rd.

UNITED STATES PATENT OFFICE.

ALBERT HEBBARD, OF CAMBRIDGE, MASSACHUSETTS, ASSIGNOR TO HIMSELF AND JOHN P. ONDERDONK.

IMPROVEMENT IN CAR-SPRINGS.

Specification forming part of Letters Patent No. 113,768, dated April 18, 1871.

*To all whom it may concern:*

Be it known that I, ALBERT HEBBARD, of Cambridge, in the county of Middlesex and State of Massachusetts, have invented a new and useful Improvement in Car-Springs; and I do hereby declare the following to be a full, clear, and exact description thereof, which will enable others skilled in the art to which it appertains to make and use my invention, reference being had to the accompanying drawing, which forms a part of this specification, and in which—

Figure 1:
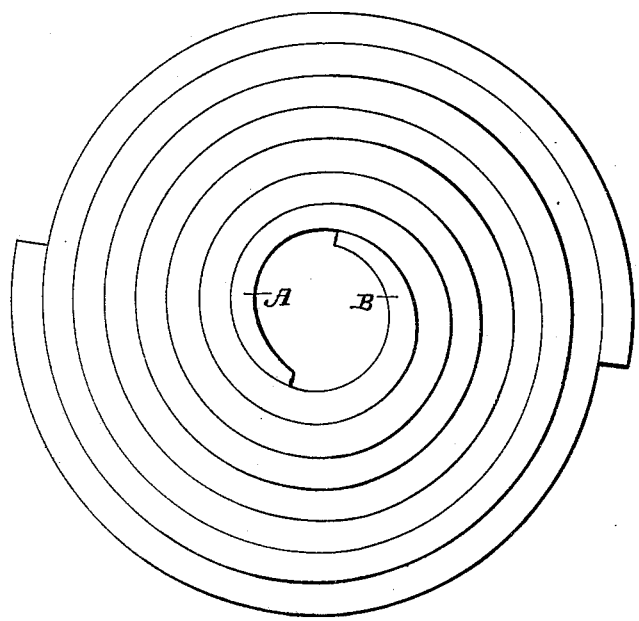
Figure 2:
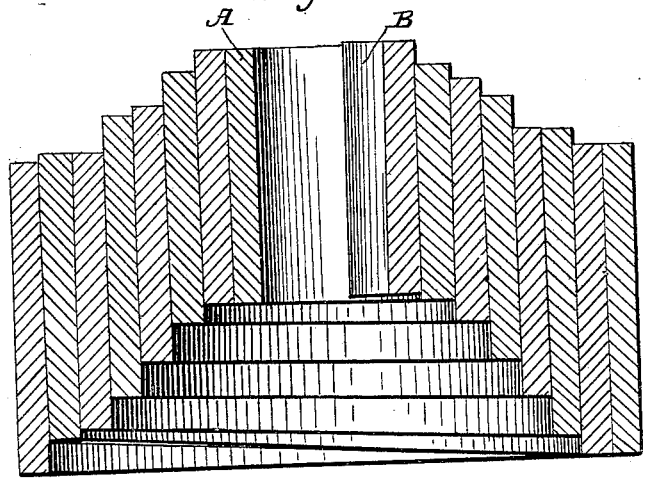

Figure 1 is a plan, and Fig. 2 an axial vertical section, of my invention.

The same parts are denoted by the same letters in both figures.

My improved car-spring consists of two or more pieces or strips of steel, A and B, wound so as to form a compound volute spring.

In winding the several parts, which must first be properly heated, I prefer to lay them one upon another, and wind them as one piece round a mandrel, or in any other convenient way, so as to form a compound volute spring, as shown in the drawing. The spring having been wound, the several parts A and B are then taken apart and separately tempered, after which they are replaced in the position shown in the drawing.

Instead of winding the several pieces as above described, they may be wound in opposite directions, (right and left,) then tempered, and inserted into each other.

The spring thus produced is not only capable of receiving a uniform temper, but the close contact of its several coils tends to counteract the continual vibration, which is a frequent cause of deterioration in railroad-car springs.

What I claim as my invention, and desire to secure by Letters Patent of the United States, is—

The volute spring composed of two or more pieces, A and B, each of which is inserted between the coils of the other.

ALBERT HEBBARD.

Witnesses:
 P. E. TESCHEMACHER,
 N. W. STEARNS.